March 21, 1961     O. V. SAUNDERS     2,975,619
REFRIGERATOR WITH MEAT STORAGE RECEPTACLE
Filed March 16, 1959
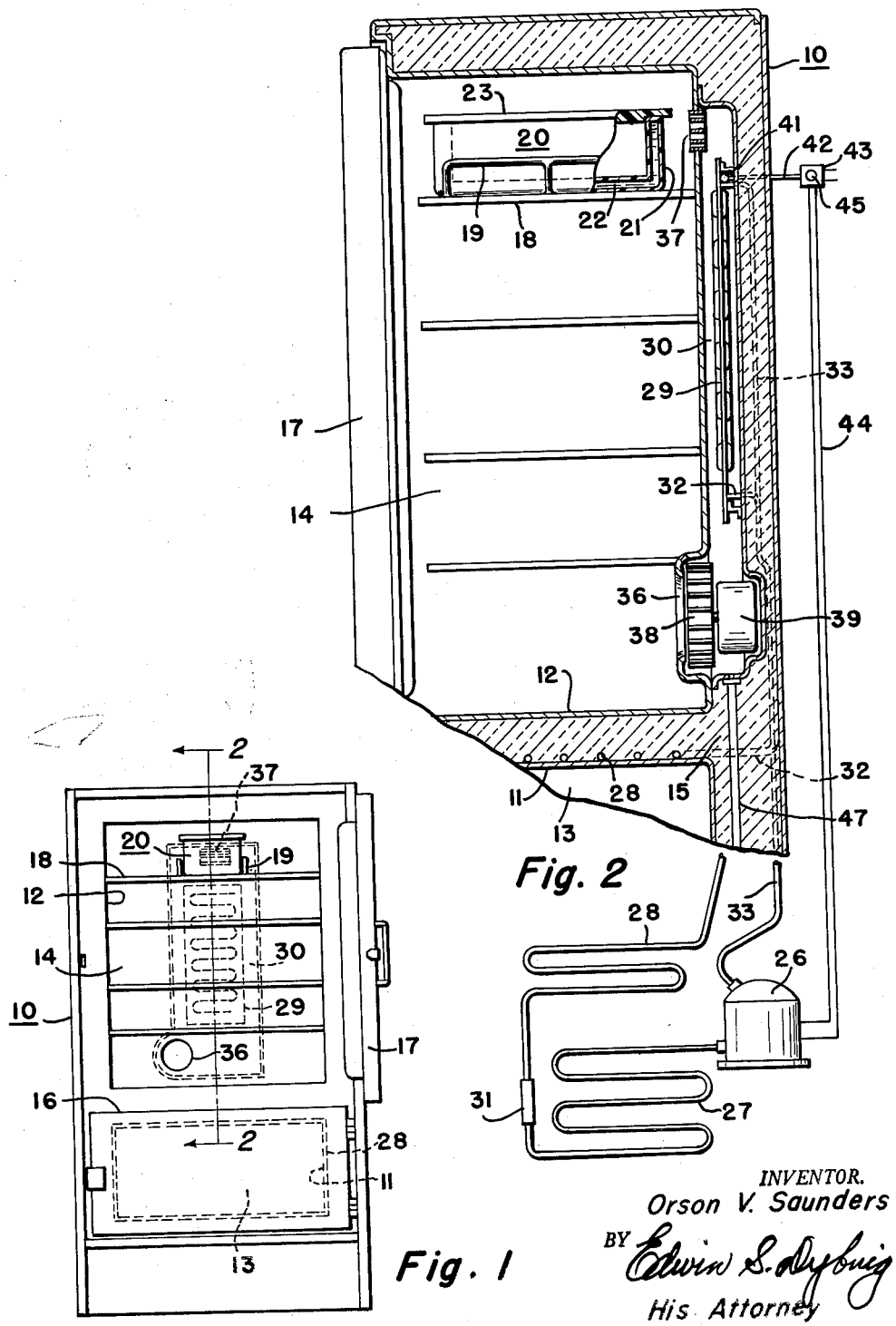
INVENTOR.
Orson V. Saunders
BY Edwin S. Dybvig
His Attorney United States Patent Office 2,975,619
Patented Mar. 21, 1961

2,975,619
REFRIGERATOR WITH MEAT STORAGE RECEPTACLE

Orson V. Saunders, Dayton, Ohio, assignor to General Motors Corporation, Detroit, Mich., a corporation of Delaware Filed Mar. 16, 1959, Ser. No. 799,686

1 Claim. (Cl. 62—419)

This invention relates to refrigerating apparatus and particularly to the refrigeration of food products in a receptacle located in a food compartment of a household refrigerator.

The desirability of maintaining fresh cuts of meat, such as steaks and chops, placed in a receptacle or a so-called meat tender container located in a food compartment of a household refrigerator cabinet substantially at a constant temperature to preserve the quality and freshness of the meat has been recognized but presents problems particularly in present day refrigerators. In some present day or modern refrigerators, the evaporator of the refrigerating system associated therewith and employed to cool the food compartment thereof is cyclically defrosted or defrosted after each cycle of reducing the temperature of the compartment to its predetermined low limit. In other modern refrigerators air is forcibly circulated over an evaporator and throughout the food compartment, and a noncirculation of the air or circulation thereof over the evaporator while it is being defrosted causes the air leaving the evaporator to temporarily increase in temperature. In either case, the temperature of air circulating over the evaporator is periodically increased, and the evaporator within the food compartment may linger or remain for an extended period of time close to the high temperature limit to be maintained in the compartment thus causing an undesired fluctuation in the temperature of cuts of fresh meats stored in a receptacle or container disposed therein. Ordinarily, purchased fresh meat cuts, such as steaks and chops or the like, are placed in a meat receptacle within a refrigerator cabinet for storage therein for about a week. However, under the condition of such fluctuation in temperature of meat cuts in a food compartment of a refrigerator, it is detrimental to the proper storage and preservation thereof, and if the meat is to be consumed, while still possessive of its freshness, a housewife must cook the meat much sooner than anticipated. This is objectionable and not at all conservative when a housewife desires to take advantage of weekly bargains at local stores or markets. I therefore contemplate an arrangement for keeping the interior of a meat storage receptacle located in a food compartment of a refrigerator cabinet at a substantially constant temperature intermediate upper and lower predetermined temperature limits normally maintained in the receptacle when the temperature ambient the receptacle fluctuates or increases so as to properly preserve the freshness of meat cuts stored in the receptacle.

An object of my invention is to substantially stabilize the temperature within a meat storage receptacle located in a food compartment of a refrigerator cabinet while the temperature in the compartment ambient to the receptacle lingers around or rises above the high temperature limit normally maintained in the receptacle during operation of a refrigerator system associated with the cabinet.

Another object of my invention is to provide a means associated with a meat storage receptacle located in the food compartment of a household refrigerator cabinet which will maintain the temperature within the receptacle substantially constant between upper and lower temperature limits at which the receptacle is normally chilled.

A still further and more specific object of my invention is to provide a meat storage receptacle located in a food compartment of a refrigerator cabinet with a closed hollow wall or walls containing a temperature holdover substance which keeps the temperature interiorly of the receptacle below the normal high temperature limit at which it is normally cooled to prevent the temperature of freshly cut steaks, chops and the like stored in the receptacle from fluctuating too much whereby to preserve the fresh quality of the meat over a prolonged period of time.

Further objects and advantages of the present invention will be apparent from the following description, reference being had to the accompanying drawings wherein a preferred embodiment of the present invention is clearly shown.

In the drawing:

Figure 1 is a front view of a household refrigerator cabinet having my invention embodied therein and showing the door to the food compartment in open position;

Figure 2 is an enlarged fragmentary vertical sectional view of the refrigerator disclosed in Figure 1 and is taken on the line 2—2 thereof showing a refrigerant translating device of a refrigerating system diagrammatically associated with the refrigerator.

Referring to the drawing wherein my invention is illustrated, reference numeral 10 generally designates a household refrigerator cabinet having a refrigerating system associated therewith. Cabinet 10 comprises the usual sheet metal outer shell or panels which serve to support inner metal liners 11 and 12 forming a lower frozen food storage compartment 13 and an upper unfrozen food storage compartment 14 respectively therein. Suitable insulating material 15 (see Figure 2) is provided between the outer cabinet shell and the liners 11 and 12. The compartments 13 and 14 are normally closed by insulated doors 16 and 17 respectively. A plurality of shelves are disposed in compartment 14, and the uppermost shelf 18 includes a central supporting portion separated from side supporting portions thereof by upstanding guide rails 19 between which a covered meat storage receptacle, generally represented by the reference numeral 20, is slidably and removably supported. This meat storage receptacle 20 includes a closed hollow molded plastic wall or walls 21 containing a suitable temperature hold-over substance 22 and a lid or cover 23. The substance 22 may be of any desirable or conventional character, such as a jell, a refrigerant interchange medium, an alcoholic aqueous solution, brine or the like. The construction of a receptacle and sealing of a substance in hollow molded plastic walls thereof of this nature is well-known to those skilled in the art and needs no detailed description herein for an understanding of the present invention. The refrigerating system associated with cabinet 10 consists of a refrigerant translating device in the form of a sealed motor-compressor unit or element 26 and a condenser 27 connected by suitable conduits to a first refrigerant evaporator 28, wrapped or coiled around and secured in metal to metal contact with liner 11, and another or second sheet metal plate type refrigerant evaporator 29. In a refrigerating system of the type disclosed and employed to cool the compartments 13 and 14, compressed refrigerant leaving the sealed casing about the motor-compressor unit 26 flows into the condenser 27 where it is cooled and liquefied whence the liquid refrigerant flows under control of a fixed restrictor or the like 31 into evaporator 28. After evaporator 28 has been filled with liquid refrigerant, surplus refrigerant, contained in the system, flows through an unrestricted passage or conduit 32 into the second evaporator 29 which is located in an air flue 30 at the back of compartment 14 and serves to cool this main food storage compartment in a manner to be explained more fully hereinafter. The gaseous or vaporized refrigerant outlet of evaporator 29 may be associated with an accumlator formed in evaporator 29 which is in turn connected to the inlet of the motor-compressor unit 26 by means of the usual refrigerant suction or return line conduit 33.

As before stated, evaporator 29 is mounted, by any suitable or desirable mounting means, in an air flue 30 arranged in the back wall of compartment 14 as best shown in Figure 2 of the drawing. Flue 30 is provided with a lower air inlet opening 36 and an upper air outlet opening 37, protected by suitable louvers or the like, both communicating with the interior of compartment 14. A fan or blower 38 located adjacent the flue inlet 36 is driven or operated by an electric motor 39. The fan or blower 38 is employed to forcefully circulate air into the flue from compartment 14 over evaporator 29 so as to cool the air, and the cooled air is discharged from flue 30 through outlet 37 into the upper central portion of compartment 14. Cold air egressing from the flue through opening 37 is circulated against, over and around walls of receptacle 20 in thermal exchange relationship with the substance 22 therein and then flows downwardly over and around foods stored on the shelves in compartment 14 in its return to the inlet opening 36 of flue 30. The hold-over substance 22 within the closed hollow wall or walls 21 of receptacle 20 is chilled to the temperature of the lowest temperature air egressing from flue 30 thereby cooling the interior of receptacle 20 and, consequently, cuts of meat stored therein to this low temperature. Cold air contacting receptacle 20 is below 30° F., and therefore, in addition to increasing the utility of this receptacle in accordance with the present invention, the location of receptacle 20 prevents storage in front of the cold air flue outlet opening 37 of items or products that are not to be frozen, such as bottles of milk and the like.

The control for the motor-compressor unit or element 26 of the refrigerating system consists of a thermostatic bulb 41 mounted on the upper end of evaporator 29 as shown in Figure 2. Bulb 41 has a tube or conduit connection 42 with a switch 43 arranged in an electrical circuit 44 leading to motor-compressor unit or element 26 so as to start and stop the motor thereof in accordance with temperatures on evaporator 29. Switch 43 includes the usual cold control adjustment 45 which enables one to vary the setting of switch 42 so as to maintain either colder or warmer temperatures in accordance with well-known practice. The switch 42 is preferably set to deenergize or stop operation of the motor of unit or element 26 when the temperature at the bulb 41 drops to 2° F. and reenergizes or restarts this motor and the compressor, drivingly connected thereto, when the temperature at bulb 41 reaches a value of somewhere between 34° and 36° F. Normally the temperature of air as it leaves the evaporator 29 and egresses out of flue 30, through opening 37, is between 25° and 32° F. and this air maintains the interior of compartment 14 at an average temperature of 40° F. By virtue of this type of control and the refrigerant circuit arrangement shown together with the proportions of the evaporators to the sizes of the compartments to be cooled, it is possible to maintain the desired temperature differential between the frozen food storage compartment 13 and the larger main food storage compartment 14 at all times and to cause the evaporator 29 to defrost itself during each deenergization or off cycle of element 26 without melting any of the frozen foods in compartment 13. Since evaporator 28 is the first to receive liquid refrigerant, it should be obvious that the frozen food compartment 13 will be maintained properly refrigerated at all times before any surplus refrigerant in the refrigerating system will flow upwardly into the second or sheet metal plate evaporator 29. It should also be obvious that, when the motor-compressor unit or element stops operating, the refrigerant in evaporator 29 can drain into evaporator 28 so as to continue refrigerating the frozen food compartment after the last of the refrigerant has been vaporized in evaporator 29. When no more refrigerant is left in the evaporator 29, air flowing or being circulated over this evaporator will rather quickly raise the temperature thereof above 32° F. or above the freezing point of frost accumulated thereon so as to thereby cause defrosting of evaporator 29. The condensate or frost water drains from the bottom of flue 30 through a bottom opening therein whence it enters a pipe or conduit 47 which conveys the condensate water out of cabinet 10 for disposal in any suitable or conventional manner.

As before stated, it is highly desirable to prevent the temperature of cuts of fresh meat placed and stored in a receptacle located within compartment 14 from varying over a wide range. In the present disclosure, the interior of receptacle 20 is normally chilled to a below freezing temperature or between predetermined upper and lower temperature limits of 25° to 32° F. by cold air egressing from flue 30 under the influence of blower 38. The hold-over substance 22 in a wall or walls of receptacle 20 is exposed to cool air in compartment 14 and is also cooled to the temperature of air egressing from flue 30. This hold-over substance forms a means thermally contacting receptacle 20 and is cooled by air circulated over the receptacle which is herein advantageously utilized to accomplish objects of my invention. For example, while evaporator 29 is being defrosted and/or during a period of time when blower 38 is inoperative, air ambient receptacle 20 tends to temporarily increase the temperature therein above 32° F. However, the low temperature of the hold-over substance 22 thereupon becomes effective to cool the interior of receptacle 20 and, consequently, meats stored therein. By virtue of the auxiliary cooling effect produced by hold-over substance 22, the temperature within receptacle 20 is stabilized or maintained between the predetermined upper and lower temperature limits at which it is normally chilled by the 25° to 32° F. air circulated over evaporator 29 and egressing from flue 30 through opening 37. Thus hold-over substance 22 serves to prevent air ambient receptacle 20 from raising the temperature therein above 32° F. during a temporary period of time, and therefore meat stored in the receptacle is maintained at a substantially uniform, constant and more desirable temperature for the proper preservation of the meat. As a result of my innovation, temporary wide fluctuations in the temperature of meats stored within receptacle or container 20 are eliminated, and the meat is kept in an unimpaired condition and stored over a prolonged period of time during which the quality of freshness, etc., of the meat cuts, steaks or chops, is retained.

While the embodiment of the present invention as herein disclosed, constitutes a preferred form, it is to be understood that other forms might be adapted.

What is claimed is as follows:

In combination, a refrigerator cabinet having a food compartment therein provided with a front opening closed by a door, a refrigerating system associated with said cabinet including a refrigerant evaporator for cooling air in said compartment, said evaporator being disposed in a flue provided in the cabinet having an inlet opening and an outlet opening communicating with said compartment, means for circulating air from said compartment into said flue over said evaporator to cool the air to a temperature below 32° F. and force the cold air out of the flue back into the compartment through said flue openings respectively, a support within said compartment in the vicinity of said flue outlet opening having opposed upstanding guide means thereon, a rectangularly shaped open top receptacle within said compartment adapted to have cuts of fresh meat stored therein, a lid movably mounted on and carried by said receptacle closing the open top thereof and isolating the interior of the receptacle from air in said compartment, said receptacle being slidably supported on said support intermediate said opposed upstanding guide means thereon to position the receptacle adjacent said flue outlet opening, said receptacle being provided with hollow closed communicating walls containing a temperature hold-over substance, one of said hollow closed walls of said receptacle being located directly in the path of cold air egressing from said flue outlet opening to chill fresh meat cuts stored in the receptacle below 32° F., another of said hollow closed walls of said receptacle being exposed to air in said compartment, said hold-over substance serving to prevent the temperature within said receptacle from increasing above 32° F. during a period of time in which the air egressing from said flue outlet opening rises above 32° F., said receptacle being slidable along said support outwardly of said compartment through its front opening when said door is opened, said lid being movable relative to said receptacle to uncover the top thereof and provide access to meat stored therein when the receptacle is so slid, said opposed upstanding guide means on said support guiding said receptacle upon closing its lid and sliding the receptacle back into said compartment to relocate same in said path of cold air egressing from said flue outlet openings, and said receptacle together with said lid thereon being detachable from said support and removable as a unit from said compartment.

References Cited in the file of this patent
UNITED STATES PATENTS

| | | |
|---|---|---|
| 1,985,816 | Chadwick | Dec. 25, 1934 |
| 2,039,736 | Munters | May 5, 1936 |
| 2,194,176 | Yoxsimer | Mar. 19, 1940 |
| 2,416,354 | Shoemaker | Feb. 15, 1947 |
| 2,482,222 | Strang | Sept. 20, 1949 |
| 2,504,372 | Anderson | Apr. 18, 1950 |
| 2,526,165 | Smith | Oct. 17, 1950 |
| 2,694,297 | Shoemaker | Nov. 16, 1954 |
| 2,709,900 | Zearfoss | June 7, 1955 |
| 2,859,595 | Murphy | Nov. 11, 1958 |